(12) United States Patent
Furuya

(10) Patent No.: US 8,375,167 B2
(45) Date of Patent: Feb. 12, 2013

(54) STORAGE SYSTEM, CONTROL APPARATUS AND METHOD OF CONTROLLING CONTROL APPARATUS

(75) Inventor: Masanori Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 12/824,334

(22) Filed: Jun. 28, 2010

(65) Prior Publication Data

US 2010/0332780 A1    Dec. 30, 2010

(30) Foreign Application Priority Data

Jun. 30, 2009    (JP) .................................. 2009-155929

(51) Int. Cl.
*G06F 12/00*    (2006.01)

(52) U.S. Cl. ........ 711/114; 711/156; 711/162; 711/165; 711/170

(58) Field of Classification Search ........................ None
See application file for complete search history.

(56) References Cited

U.S. PATENT DOCUMENTS

| 2006/0031637 A1 | 2/2006 | Komikado et al. | |
| 2007/0245114 A1 | 10/2007 | Kakui et al. | |
| 2008/0120459 A1 * | 5/2008 | Kaneda et al. | 711/112 |

FOREIGN PATENT DOCUMENTS

| JP | 11-143779 | 5/1999 |
| JP | 11-353234 | 12/1999 |
| JP | 2002-278706 | 9/2002 |
| JP | 2006-048300 | 2/2006 |
| JP | 2006-146580 | 6/2006 |
| JP | 2007-310861 | 11/2007 |

OTHER PUBLICATIONS

Japanese Patent Office Notification of Reasons for Refusal issued Mar. 1, 2011 for corresponding Japanese Patent Application No. 2009-155929.
Partial English Translation of Japanese Office Action mailed Dec. 6, 2011 issued in corresponding Japanese Patent Application No. 2009-155929.

* cited by examiner

*Primary Examiner* — Shawn X Gu
(74) *Attorney, Agent, or Firm* — Staas & Halsey LLP

(57) ABSTRACT

A storage system has a storage pool for at least one of a logical volume having a plurality of slices, a memory for storing a slice table indicating whether each slices of the logical volume is assigned from the storage pool or not, and a controller for receiving a release command for releasing one of the slices, sending out a response indicating the releasing of one of the slices corresponding to the release command has completed regardless of an execution of processing corresponding to the release command, duplicating a copy target area included in the one of the slices corresponding to the release command into a copy target volume included in the storage pool, and releasing the one of the slices upon completely duplicating the copy target area into the copy target volume.

15 Claims, 14 Drawing Sheets

FIG. 1
ALLOCATION WITH NORMAL WRITE I/O
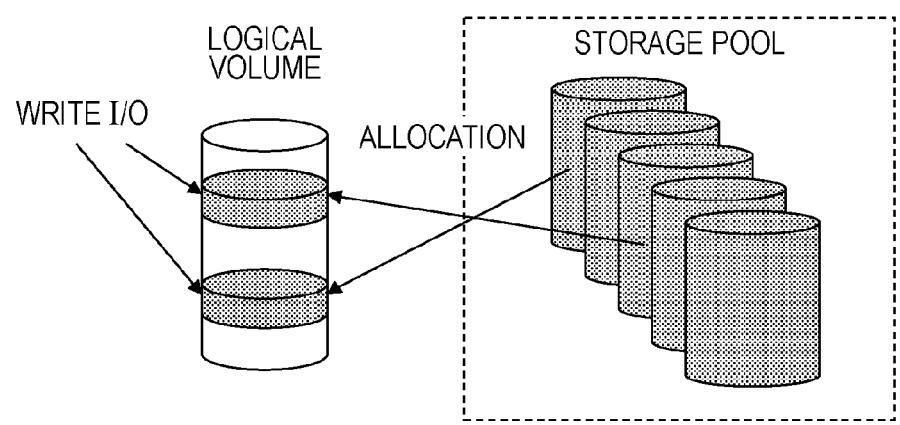
RELEASE PROCESS WITH INITIALIZATION COMMAND
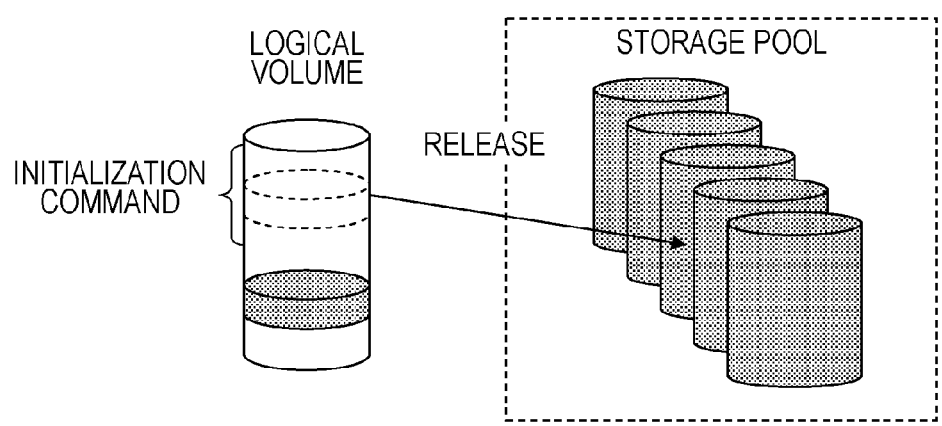

FIG. 4

| IDENTIFIER | COPY TYPE | COPY SOURCE | | COPY DESTINATION | | BLOCK VOLUME |
|---|---|---|---|---|---|---|
| | | LUN | INITIAL LBA | LUN | INITIAL LBA | |
| 0x0 | OPC | 0x0 | 0x10 | 0x1 | 0x10 | 0x100000 |
| 0x1 | OPC | 0x2 | 0x400 | 0x3 | 0x800 | 0x500000 |

FIG. 5

| IDENTIFICATION NUMBER | VIRTUAL VOLUME INFORMATION | | PHYSICAL VOLUME INFORMATION | |
|---|---|---|---|---|
| | LUN | LBA | LUN | LBA |
| 0 | 0x02 | 0x10000 | 0x20 | 0x50000 |
| 1 | 0x02 | 0x20000 | 0x21 | 0x10000 |
| 2 | 0x02 | 0x30000 | 0x20 | 0x60000 |
| . | . | . | . | . |
| . | . | . | . | . |
| . | . | . | . | . |

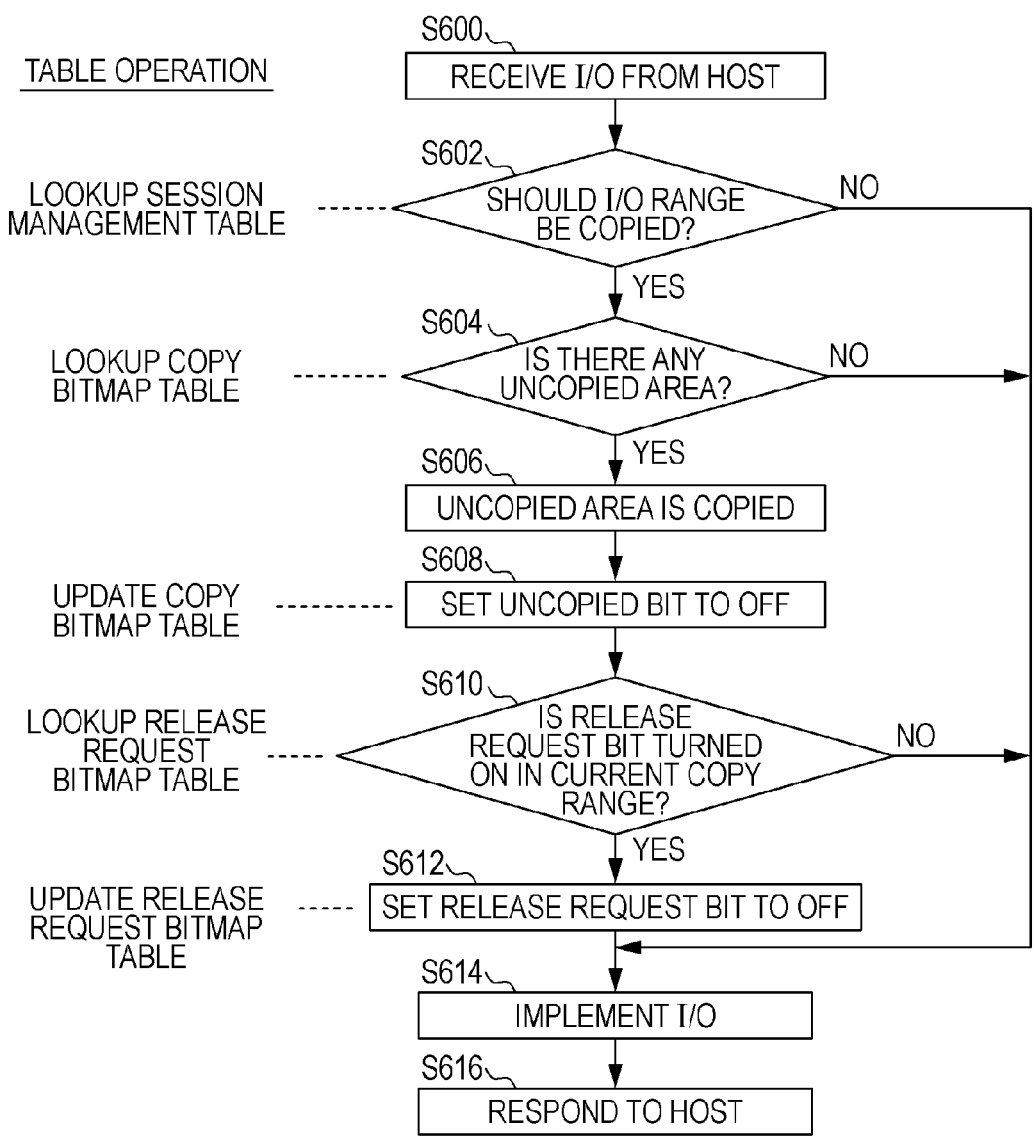

STORAGE SYSTEM, CONTROL APPARATUS AND METHOD OF CONTROLLING CONTROL APPARATUS

CROSS-REFERENCE TO RELATED APPLICATION

This application is based upon and claims the benefit of priority of the prior Japanese Patent Application No. 2009-155929, filed on Jun. 30, 2009, the entire contents of which are incorporated herein by reference.

FIELD

The present art relates to a storage system, a control apparatus and a method of controlling the control apparatus.

BACKGROUND

With a recent increase in storage capacity required for storage devices, mechanisms for virtually allocating physical resources, including disks, have been received attention. In Thin Provisioning, one of such mechanisms, no correlation is made between a logical volume and a physical disk at the time of creation of the logical volume. The physical disk of a storage pool is dynamically allocated only when data is actually written by a host.

In order to release the allocated physical volume in Thin Provisioning, the entire logical volume may be initialized or a certain area of the logical volume may be released specified by, for example, logical block address (LBA) in accordance with an initialization command issued by a host or other component.

In Thin Provisioning, it is assumed that a host or other component issues an initialization command for a larger range than a normal I/O range during release of allocated physical volumes. In a copying function in which snapshots of a logical volume are created on an on-demand basis, however, data is written and the logical volume is released typically after areas corresponding to the copy source volume are synchronously copied to a copy destination volume during execution of an I/O or an initialization command for uncopied areas.

As described above, since the copying process and the releasing process are performed asynchronously in response to the initialization command issued with respect to the logical volume to be copied on an on-demand basis, a response process indicating the releasing process has been completed may be delayed and the response may be degraded.

Japanese Laid-Open Patent Publication No. 2007-310861 and Japanese Laid-Open Patent Publication No. 2006-48300 are examples of related art.

SUMMARY

According to an aspect of an embodiment, a storage system has a storage pool for at least one of a logical volume having a plurality of slices, a memory for storing a slice table indicating whether each slices of the logical volume is assigned from the storage pool or not, and a controller for receiving a write request from a host, generating at least a slice in the logical volume by assigning a part of the storage pool according to the received write request and updating the slice table in the memory when the slice corresponding to the received write request is not assigned from the storage pool in reference to the slice table, and writing data into at least one of the slices according to the received write request, wherein the controller receives an release command for releasing one of the slices, sends out a response indicating the releasing of one of the slices corresponding to the release command has completed regardless of an execution of processing corresponding to the release command, duplicates a copy target area included in the one of the slices corresponding to the release command into a copy target volume included in the storage pool, and releases the one of the slices upon completely duplicating the copy target area into the copy target volume.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 schematically illustrates allocation and releasing in typical Thin Provisioning;

FIG. 4 illustrates a session management table according to an embodiment;

FIG. 5 illustrates a LBA translation table according to an embodiment;

FIG. 18 is a flowchart illustrating a process in response to a received initialization command in accordance with another embodiment.

DESCRIPTION OF EMBODIMENTS

An upper half of FIG. 1 schematically illustrates allocation of a physical area in a normal writing process (Write I/O) in typical Thin Provisioning. In FIG. 1, hatched areas of the logical volume represent allocated areas. A lower half of FIG. 1 schematically illustrates a releasing process of the specified area on the basis of the initialization command in typical Thin Provisioning.

Figure 2:
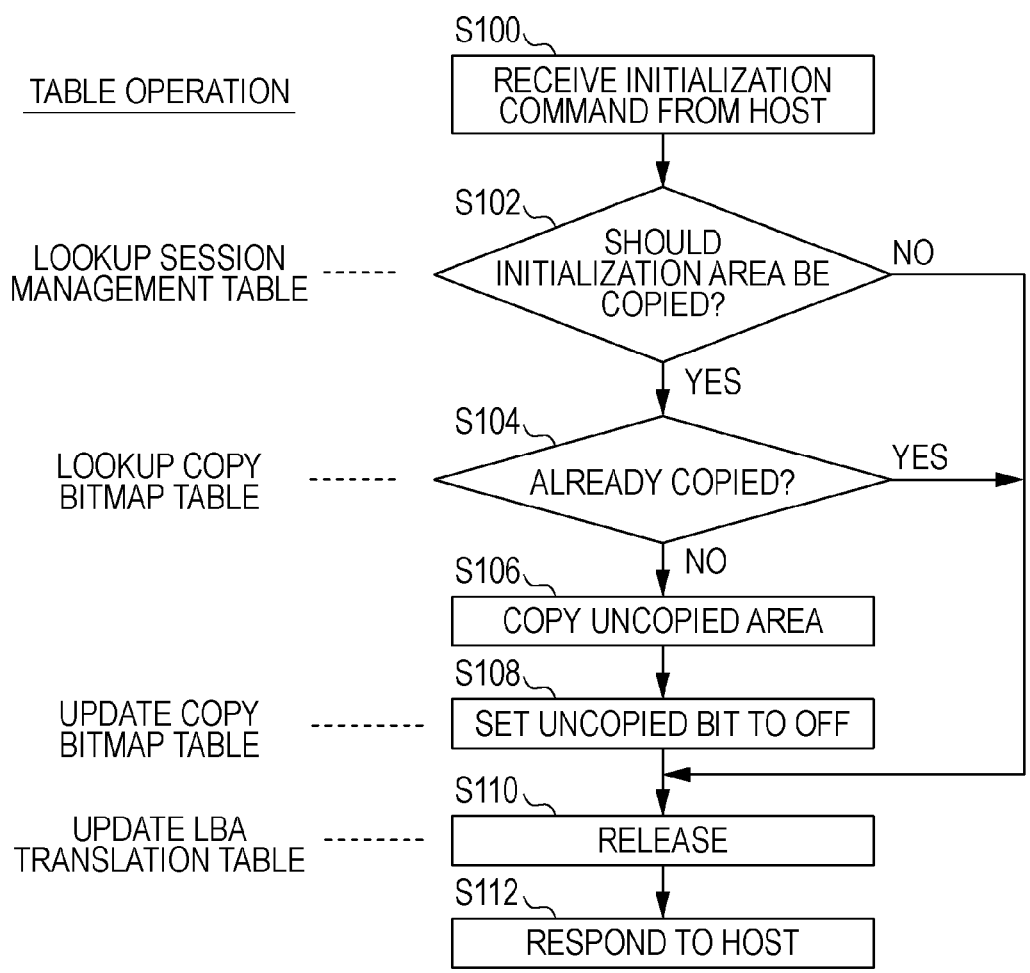
FIG. 2 is a flowchart illustrating a process in response to an initialization command in typical Thin Provisioning.

FIG. 2 illustrates a typical process upon reception of an initialization command for the copy source volume in Thin Provisioning.

Upon reception of an initialization command for a copy source volume from, for example, a host computer (S100), it is determined, on the basis of, for example, a later-described session management table showing correlation between copy source areas and copy destination areas, whether or not an initialization range specified by the initialization command is an area to be copied (S102). If the initialization range is not an area to be copied (S102: NO), a physical area allocated to that area is released (S110). If the initialization range is an area to be copied (S102: YES), it is determined whether or not the area to be copied has already been copied (S104) on the basis of, for example, a later-described copy bit. The copy bit represents whether or not each area has already been copied. If the area has already been copied (S104: YES), the physical area allocated to that area is released (S110). If the area has not been copied (S104: NO), the uncopied area is copied to a copy destination volume (S106) and the copy bit related thereto is set to OFF (S108). Then, the physical area allocated to that area is released (S110) and a response is returned to the host computer.

Figure 3:
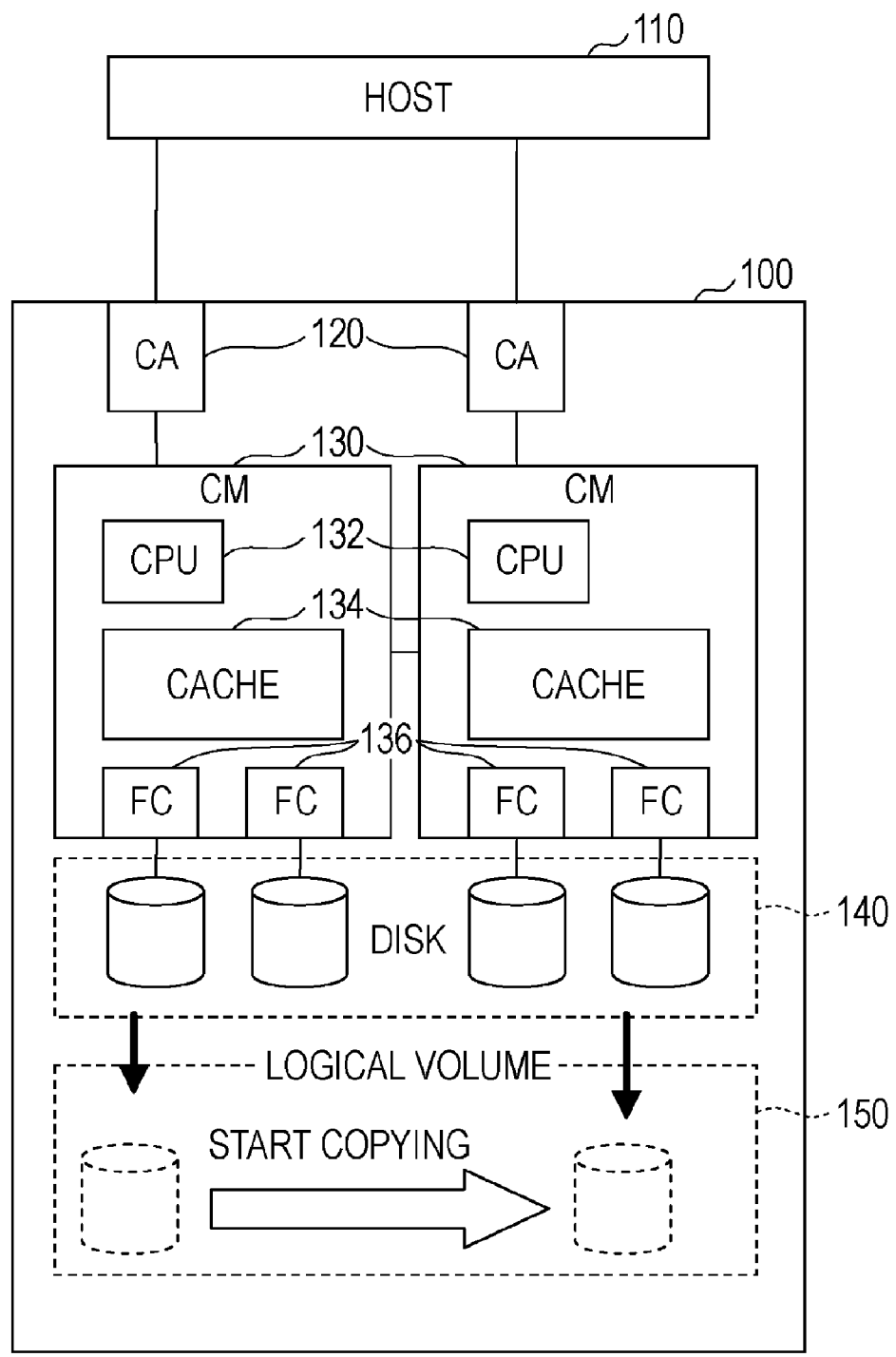
FIG. 3 illustrates an exemplary configuration of a storage system according to an embodiment.

A storage system according to an embodiment will be described with reference to FIG. 3. FIG. 3 illustrates an exemplary configuration of a storage system according to an embodiment.

A storage system 100 is connected to one or more host computers 110. The storage system 100 includes one or more channel adapters (CA) 120, one or more controller modules (CM) 130, one or more disks 140 and one or more logical volumes 150.

An operator gives various instructions to the storage system 100 via the host computer 110. Typically, the host computer 110 is implemented by a computer connected to the storage system 100 via, for example, a network. Although only one host computer 110 is illustrated in the present embodiment, any number of host computers 110 may be connected to the storage system 100.

The channel adapter (CA) 120 functions as an interface (I/F) between the host computer 110 and the storage system 100 and controls data communication therebetween. Although the channel adapter 120 is used as an interface between the host computer 110 and the storage system 100 in the present embodiment, the present disclosure is not limited to the same. Any interfacing means that provides data communication between the host computer 110 and the storage system 100 may be suitably employed.

The controller module (CM) 130 controls components of the storage system 100, such as the channel adapters 120 and the disks 140. The controller module 130 includes a central processing unit (CPU) 132, a cache 134 and a fibre channel (FC) interface 136.

When the controller module 130 receives an instruction from the host computer 110 via the channel adapter 120, the CPU 132 executes the received instruction and controls operations of the components of the storage system 100, including the disk 140, the channel adapter 120 and the cache 134, in accordance with the instruction. The CPU 132 may be implemented by any suitable computing device, such as a processor, which is adapted to process information.

The cache 134 is a storage unit connected to the CPU 132 and stores data and instructions used for various processes in the CPU 132. Although the cache 134 is used in the present embodiment, any other suitable storage unit may be employed alternatively.

The fiber channel interface 136 functions as an interface (I/F) between the disk 140 and the controller module 130 and controls data communication therebetween. Although the fiber channel interface 136 is used in the present embodiment, the present disclosure is not limited to the same. Any other suitable interface that provides data communication between the disk 140 and the controller module 130 may be employed alternatively.

The disk 140 is used as a user disk or a backup disk that provides physical volume for the logical volume 150. As illustrated in FIG. 3, one or more disks 140 constitute a storage pool which provides physical volume in Thin Provisioning.

The logical volume 150 is a virtually defined volume to which a physical volume is allocated from the storage pool consisting of one or more disks 140 during, for example, writing of data. In the present embodiment, the logical volume 150 is a variably allocated virtual volume to which a physical volume is variably allocated in accordance with a usage condition. Thin Provisioning is an exemplary mechanism for variably allocating a physical volume in accordance with a usage condition. In typical Thin Provisioning, a physical volume required for the storage is not initially provided. Instead, only a physical volume corresponding to an actual storage amount is provided. The requested storage amount is provided as a virtual volume. When the amount of the actual storage used is about to exceed the originally provided physical volume, the physical volume is increased by the exceeding amount and the operation is continued. Thus, Thin Provisioning allows establishing a virtual volume which is larger than the actually provided physical volume. Although the logical volume 150 is implemented by a variably allocated virtual volume in the present embodiment, the present disclosure is not limited to the same. In other embodiments, the logical volume 150 may be implemented by any other suitable virtual volume.

In the present embodiment, the logical volume 150 functions as both a copy source volume and a copy destination volume and the copying process in the storage system 100 is executed with respect to the logical volume 150.

Although two logical volumes 150, i.e., the copy destination volume and the copy source volume, are illustrated in the present embodiment, the present disclosure is not limited to the same. In other embodiments, three or more logical volumes 150 may be provided alternatively.

Next, with reference to FIGS. 4 and 5, tables for managing various pieces of information used in the embodiments will be described.

The session management table is configured to manage information including a copy type of each copy session, a range to be copied in the copy source volume and a range to be copied in the copy destination volume each copy session. The copying process is managed on the basis of the copy session. In the embodiment described below, the session management table is used for determination as to whether or not each virtual region of the logical volume 150 is an area to be copied. Typically, the session management table is loaded in, for example, the cache 134 during the copying process. The controller module 130 looks up the session management table to confirm details of each copy session of the copying process. As illustrated in FIG. 4, the session management table according to an embodiment includes an identifier, a copy type of the copy session, such as One Point Copy (OPC), a Logical Unit Number (LUN), an initial Logical Block Address (LBA) and a block volume. The identifier specifies each copy session. The LUN is an identifier for identifying a copy source volume and a copy destination volume which are objects for the copy session. The initial LBA specifies leading areas or blocks of the copy source volume and the copy destination volume in a range to be copied of the copy session. The block volume specifies the length from the initial LBA in the range to be copied. In the present embodiment, the area to be copied is defined by the initial LBA which represents the address of the leading area of the logical volume 150 and the block volume which represents the length from the initial LBA to a trailing area of the range to be copied. However, any other suitable index for specifying the range to be copied may be employed alternatively.

The copy bit map table stores a copy bit which represents whether or not each area to be copied in the logical volume 150 has already been copied. In the embodiment described below, the copy bit map table is used to determine whether or not each area to be copied has already been copied. Typically, the copy bit map table is loaded in, for example, the cache 134 during the copying process. The controller module 130 looks up the copy bit map table to determine whether or not each area to be copied of the logical volume 150 for which the copying process is to be executed has already been copied. In an embodiment, the copy bit map table is configured to manage copied/uncopied status with 1 bit corresponding to an area of 0x10 blocks. If the area has already been copied, the bit may be set to "0." If the area has not been copied, the bit may be set to "1." With this configuration, if the block volume of a copy session is 0x100000, the copy bit map table should have at least 0x10000 bits.

A LBA translation table shows, regarding the logical volume 150 of the variably allocated virtual volume in, for example, Thin Provisioning, correlation between the address on the logical volume 150 and the address on the physical volume constituted by the disks 140. In the embodiment described below, the LBA translation table is used for determination as to whether or not each virtual region of the logical volume 150 has already been allocated to the physical area. Typically, the LBA translation table is loaded in, for example, the cache 134 during the copying process. The controller module 130 looks up the LBA translation table to determine correlation between each virtual region of the logical volume 150 and the physical area of the disk 140 allocated to the virtual region. When it is necessary to allocate the physical volume in response to, for example, a writing request to the logical volume 150, the controller module 130 allocates the physical area of the disk 140 for each area of a certain volume of the logical volume 150 and writes the LBA representing address information of the allocated physical area in the LBA translation table. As illustrated in FIG. 5, the LBA translation table according to an embodiment includes identification numbers for specifying each area of the volume, virtual volume information regarding the logical volume 150 and physical volume information regarding the disk 140. In the logical volume 150 specified by the LUN of the virtual volume information, it can be determined to which area of the physical volume the area specified by the LBA has been allocated on the basis of the LUN and the LBA of the physical volume information. In the illustrated LBA translation table, the provided allocation unit of each area is 32 MB (i.e., 0x10000 block counts).

A release request bit map table stores release request bits which represent whether or not the allocated physical areas should be released for each virtual region to which the physical area of the logical volume 150 has been allocated. In the embodiment described below, the release request bit map table is used for determination as to whether or not the physical area should be released from each virtual region. Typically, the release request bit map table is loaded in, for example, the cache 134 during the copying process. The controller module 130 looks up the release request bit map table to determine whether or not the allocated physical area has already been released for each virtual region of the logical volume 150 to which the copying process is executed. In an embodiment, the release request bit map table shows a release request status of each allocation unit (i.e., a unit to which the physical area is allocated in the LBA translation volume), such as 32 MB (0x10000 block counts) for 1 bit. If the physical area is in a release request status in which allocation should be released, the bit is set to ON (i.e., "1"). If the physical area is not in the release request status, i.e., if the physical area has already been released, the bit is set to OFF (i.e., "0"). In this case, if the size of the logical volume 150 is 0x1000000, the release request bit map table should have at least 0x100 bits. The release request bit may be set before execution of determination in order to avoid delay of process accompanying determination as to whether or not the physical area is currently allocated to the corresponding virtual region current.

Next, an exemplary process in the storage system 100 upon reception of an initialization command according to an embodiment will be described with reference to FIGS. 6 and 7.

As described above with reference to FIG. 2, in the typical storage system in which a copying process is executed from a copy source volume to a copy destination volume, if an instruction for initialization is given to the copy source volume, a releasing process is executed after the uncopied area of the copy source volume is copied to the copy destination volume. Thus, the initialization process may be delayed due to the delay of the copying process. To address this problem, the copying process and the releasing process are executed asynchronously with the instruction for initialization in the present embodiment so as to improve response to the instruction for initialization.

Figure 6:
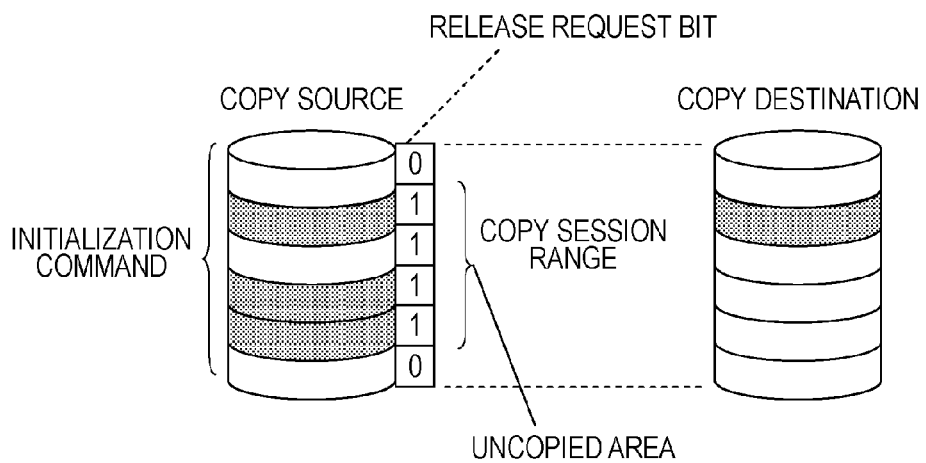
FIG. 6 schematically illustrates a process in response to a received initialization command according to an embodiment.
Figure 7:
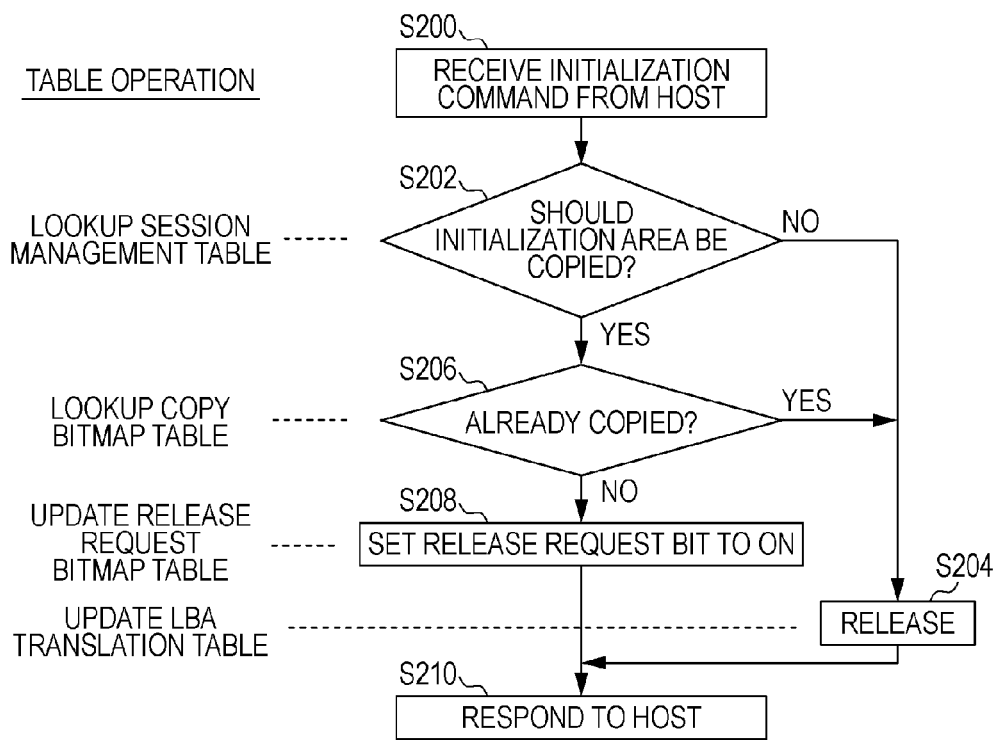
FIG. 7 is a flowchart illustrating a process in response to a received initialization command according to an embodiment.

FIG. 6 schematically illustrates a process in response to a received initialization command according to an embodiment. FIG. 7 is a flowchart illustrating a process in response to a received initialization command according to an embodiment. In FIG. 6, hatched areas in each volume represent allocated physical areas.

As illustrated in FIG. 6, upon reception of the initialization command with respect to the copy source volume, the controller module 130 looks up the session management table and determines whether or not a range to be initialized includes an area to be copied. If the area to be copied is included, the controller module 130 looks up the copy bit map table and determines whether or not the range to be copied has already been copied. If an uncopied area is included, the controller module 130 sets the release request bit of the uncopied area to ON (see the second to fifth release request bits "1" from above in FIG. 6), and returns a response to the initialization command immediately without executing the copying process for the uncopied area. Note that the release request bit of the uncopied area is set to ON (see the third release request bit "1" from above in FIG. 6) without any determination as to whether or not the physical area has already been allocated to the uncopied area. Thus, a quick response can be made to the initialization command by setting the release request bit to ON without executing the copying process for the uncopied area and by executing the copying process and the releasing process for the uncopied asynchronously with the initialization command in a background process which will be described later.

The foregoing process will be described in more detail with reference to FIG. 7. When the storage system 100 receives an initialization command with respect to the copy source volume from, for example, the host computer 110 (S200), the controller module 130 looks up the session management table loaded in the cache 134 and determines whether or not each area of the initialization range specified by the initialization command is an area to be copied (S202). If the area is not an area to be copied, i.e., if there is no copy session in the area (S202: NO), the controller module 130 releases the physical area allocated to that area and changes the record related to that area in the LBA translation table loaded in the cache 134.

If, on the other hand, the area is an area to be copied, i.e., if there is a copy session in the area (S202: YES) the controller module 130 looks up the copy bit map table loaded in the cache 134 and determines whether or not the area has already been copied to the copy destination volume (S206). If the area has already been copied (S206: YES), the controller module 130 releases the physical area allocated to the area and changes the record related to the area in the LBA translation table loaded in the cache 134.

If, on the other hand, the area has not been copied (S206: NO), the controller module 130 sets the release request bit related to that area in the release request bit map table loaded in the cache 134 to ON (i.e., "1") and returns a response to the host computer 110. In the present embodiment, the controller module 130 does not confirm whether or not the physical area has already been allocated to the initialization range as described above.

Next, the background copying process executed in response to the initialization command according to an embodiment will be described with reference to FIGS. 8 and 9.

Figure 8:
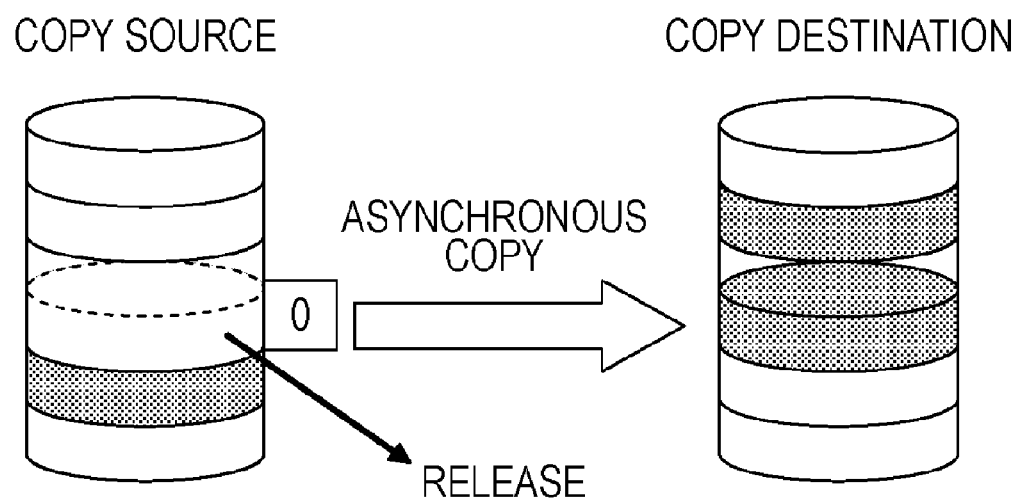
FIG. 8 schematically illustrates a background copying process related to an initialization command according to an embodiment.

FIG. 8 schematically illustrates a background copying process related to an initialization command according to an embodiment. FIG. 9 is a flowchart illustrating a background copying process related to an initialization command according to an embodiment.

As described above, in the process described with reference to FIGS. 6 and 7, a response to the initialization command is returned without execution of the copying process and the releasing process regarding the uncopied area with the release request bit set to ON. Regarding such areas, at any time after the response is returned, the copying process is executed with respect to the copy destination volume in the background and the physical area of the uncopied area is released. The background copying process according to the present embodiment is periodically started until the entire area to be copied has been copied such that the uncopied areas are sequentially copied to the copy destination volume.

When the background copying process is started as illustrated in FIG. 8, the controller module 130 looks up the session management table and retrieves an area to be copied. When an area to be copied is detected, the controller module 130 looks up the release request bit of the area to be copied. If the release request bit is set to ON, the controller module 130 copies the area to be copied to the copy destination volume. Then, the controller module 130 executes the releasing process and sets the release request bit to OFF (see the release request bit "0" relating to the fourth virtual region from above of the copy source volume in FIG. 8).

Figure 9:
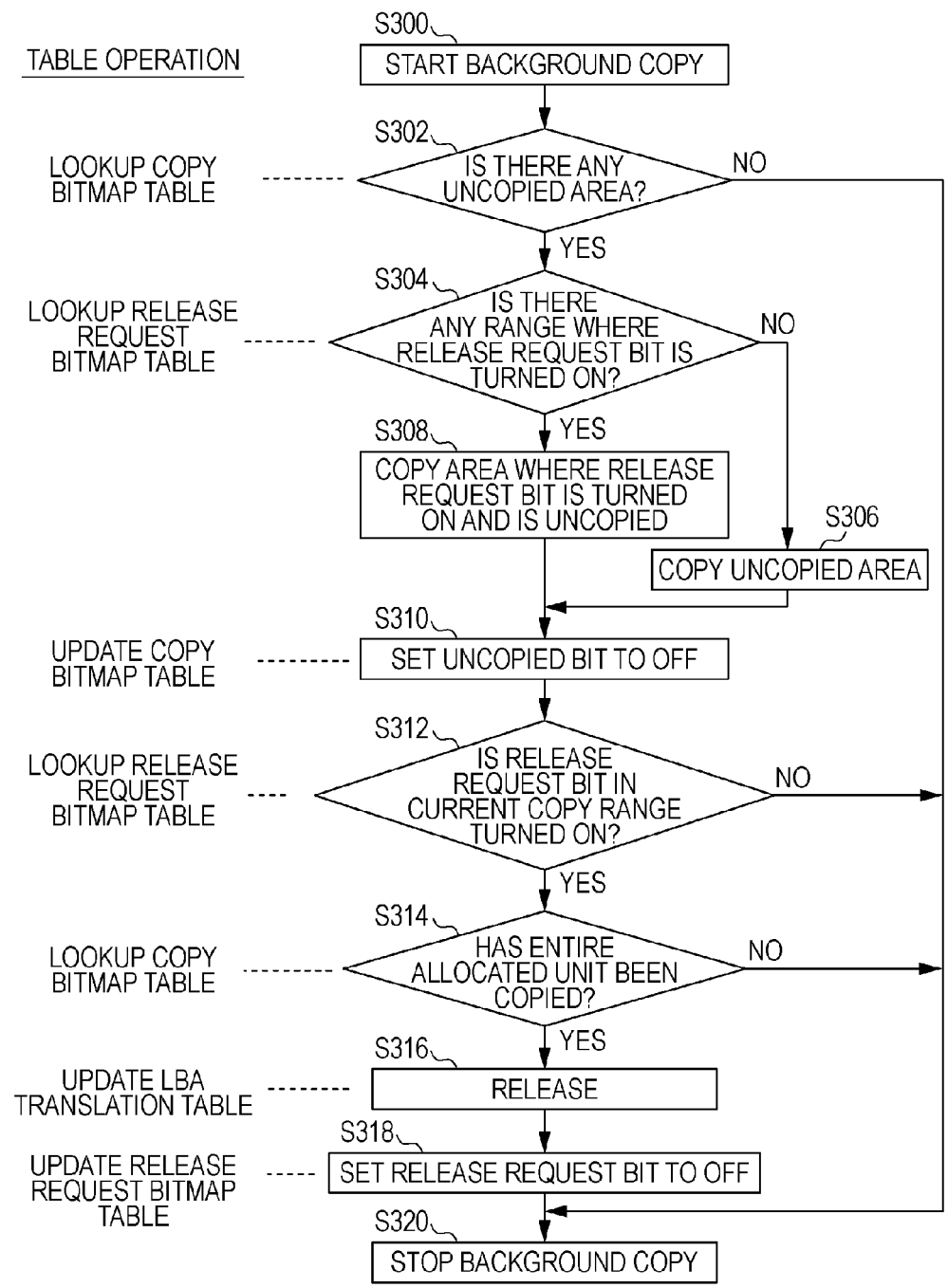
FIG. 9 is a flowchart illustrating a background copying process related to an initialization command according to an embodiment.

With reference to FIG. 9, the foregoing process will be described in more detail. Upon starting of the background copying process by the controller module 130 (S300), the controller module 130 looks up the copy bit map table loaded in the cache 134 and determines whether or not there is a uncopied area in the area to be copied (S302). If there is no uncopied area (S302: NO), the controller module 130 ends the background copying process (S320). If, on the other hand, there is a uncopied area (S302: YES), the controller module 130 looks up the release request bit map table loaded in the cache 134 and determines whether or not there is an area to be copied with the release request bit being set to ON (S304). If there is no area to be copied with the release request bit being set to ON (S304: NO), the controller module 130 copies the uncopied area to the copy destination volume (S306) and sets the copy bit related to the area of copy bit map table to OFF (i.e., "0") (S310). If, on the other hand, there is an area to be copied with the release request bit being set to ON (S304: YES), the controller module 130 copies the uncopied area with the release request bit being set to ON to the copy destination volume (S308) and sets the copy bit related to the area of the copy bit map table to OFF (i.e., "0") (S310).

Next, the controller module 130 looks up the release request bit map table and determines whether or not the release request bit is set to ON in the current copy range (S312). If the release request bit is not set to ON (S312: NO), the controller module 130 ends the background copying process (S320). If, on the other hand, the release request bit is set to ON (S312: YES), the controller module 130 looks up the copy bit map table loaded in the cache 134 and determines whether or not the entire area to be copied has already been copied (S314). If the entire area to be copied has not copied (S314: NO), the controller module 130 ends the background copying process (S320). If, on the other hand, the entire area to be copied has already been copied (S314: YES), the controller module 130 executes the releasing process regarding the area to be copied (S316) and sets the release request bit related to that area in the release request bit map table to OFF (S318). Then, the controller module 130 ends the background copying process (S320).

Next, a process related to the initialization command upon reception of a normal writing request in an uncopied area with the release request bit being set to ON according to an embodiment will be described with reference to FIGS. 10 and 11.

Figure 10:
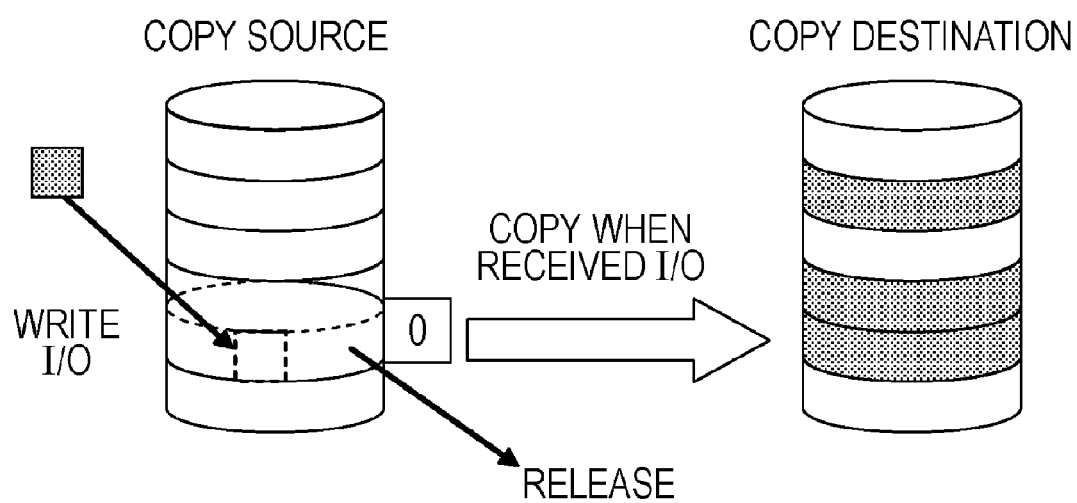
FIG. 10 schematically illustrates a releasing process related to an initial command according to an embodiment.

FIG. 10 schematically illustrates a releasing process related to an initial command according to an embodiment. FIG. 11 is flowchart illustrating a releasing process related to an initial command according to an embodiment.

As described above, in the foregoing process described with reference to FIGS. 6 and 7, a response to the initialization command is returned without execution of the copying process and the releasing process regarding the uncopied area with the release request bit being set to ON. Upon reception of a normal writing instruction (i.e., Write I/O in FIG. 10) accompanied by an I/O process, the control module 130 looks up the release request bit map table and determines whether or not the release request bit of the area to be written has been set to ON. If the release request bit has been set to ON, the control module 130 looks up the session management table and determines whether or not the area to be written is an area to be copied. If the area to be written is an area to be copied, the control module 130 looks up the copy bit map table and determines whether or not the uncopied area is included in the area to be written. If a uncopied area is included, the control module 130 executes the copying process releasing process and sets the release request bit to OFF (see the release request bit "0" relating to the fifth virtual region from above in the copy source volume in FIG. 10). Then, the received Write instruction is executed.

Figure 11:
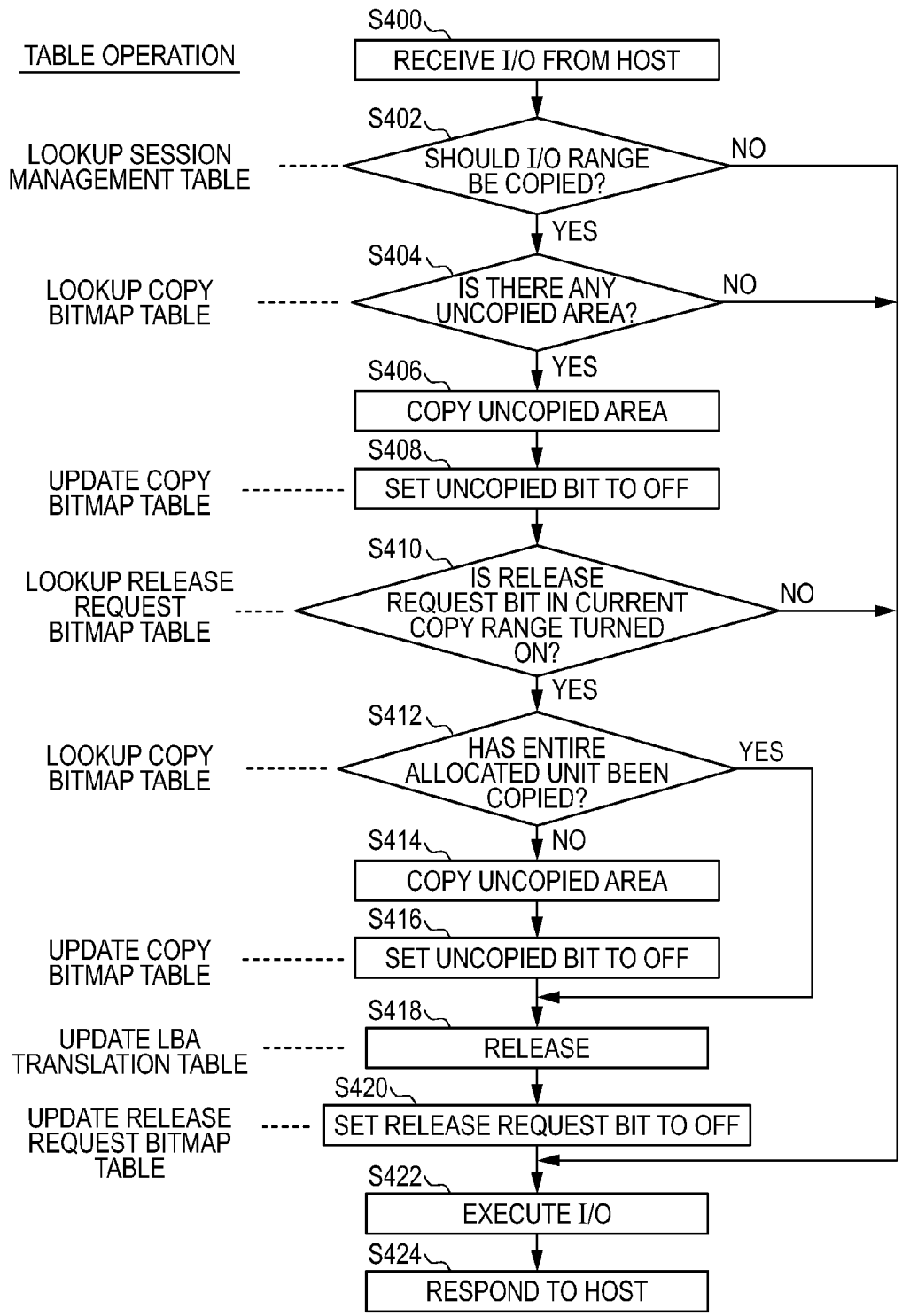
FIG. 11 is flowchart illustrating a releasing process related to an initial command according to an embodiment.

With reference to FIG. 11, the process described above will be described in more detail. When the storage system 100 receives a normal Write instruction from, for example, the host computer 110 (S400), the controller module 130 looks up the session management table loaded in the cache 134 to determine whether or not the area to be written specified by the Write instruction is an area to be copied, i.e., whether or not there is a copy session in the area to be written (S402). If there is no copy session (S402: NO), the controller module 130 executes the Write instruction (S422).

If, on the other hand, there is a copy session (S402: YES), the controller module 130 looks up the copy bit map table loaded in the cache 134 to determine whether or not there is a uncopied area in the area to be copied (S404). If there is no uncopied area (S404: NO), the controller module 130 executes the Write instruction (S422). If, on the other hand, there is a uncopied area (S404: YES), the controller module 130 copies the uncopied area to the copy destination volume (S406) and sets the copy bit related to the area in the copy bit map table to OFF (i.e., "0") (S408).

Next, the controller module 130 looks up release request bit map table loaded in the cache 134 and determines whether or not there is any area with the release request bit being set to ON in the area to be written (S410). If there is no area with the release request bit being set to ON, the controller module 130 executes the Write instruction (S422). If, on the other hand, there is an area with the release request bit being set to ON, the controller module 130 looks up the copy bit map table loaded in the cache 134 and determines whether or not the entire area to be written determines has been copied (S412). If the entire area to be written has been copied (S412: YES), the controller module 130 releases the area (S418). If, on the other hand, the entire area to be written has not been copied (S412: NO), the controller module 130 copies the uncopied area to the copy destination module (S414) and sets the copy bit related to that area in the copy bit map table loaded in the cache 134 to OFF (S416).

Then, the controller module 130 executes the releasing process (S418) and sets the release request bit related to the area in the release request bit map table to OFF (S420). Then, the controller module 130 executes the Write instruction (S422) and returns the response to the host computer 110 (S424).

An exemplary process in the storage system 100 upon reception of an initialization command according to another embodiment will be described with reference to FIGS. 12 to 16.

Figure 12:
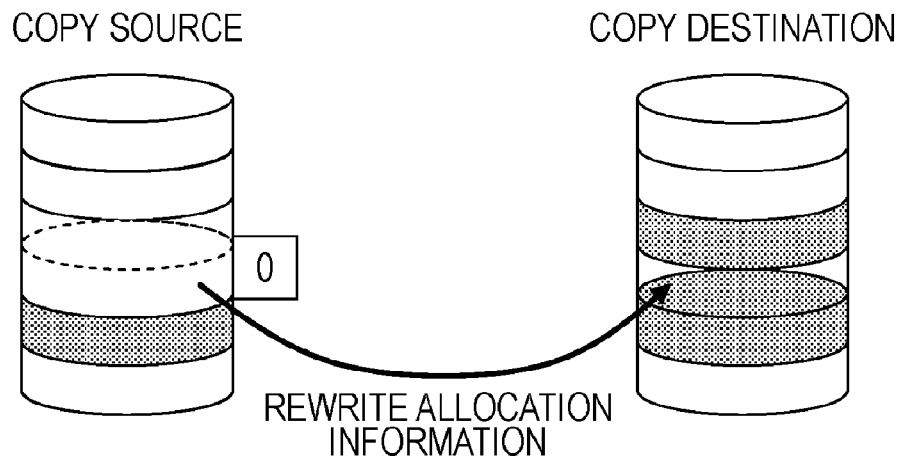
FIG. 12 schematically illustrates a process in response to a received initialization command in accordance with another embodiment.

In the copying process from the copy source volume to the copy destination volume as described above, a single copy source volume may copied to a plurality of copy destination volumes. This is called a multi-copying process. The foregoing embodiment may be applied to such a multi-copying process. In a copying process other than the multi-copying process, the copy source volume may be copied to the copy destination volume by rewriting allocation information of the physical area without actually executing the copying process. That is, as illustrated in FIG. 12, the copy source volume may be copied to the copy destination volume by reallocating the physical area currently allocated to the area to be copied of the copy source volume to the copy destination volume.

Figure 13:
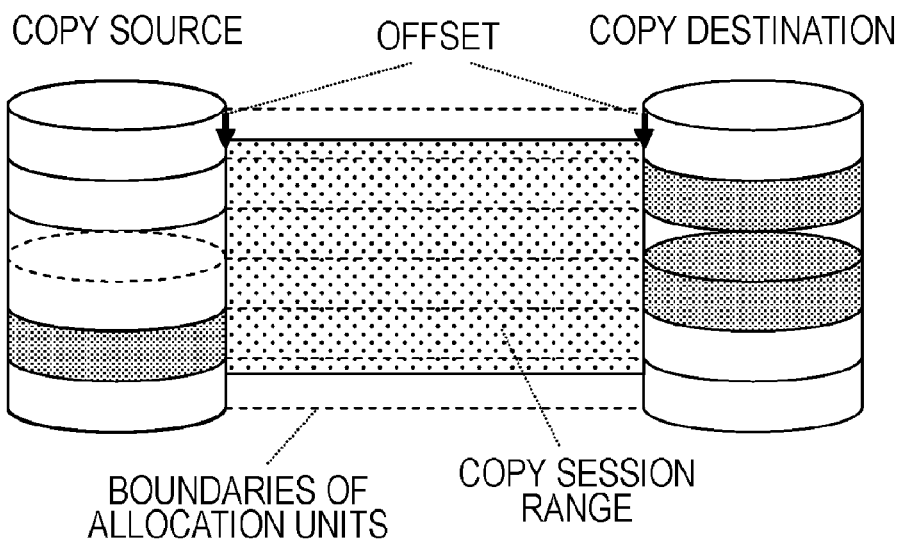
FIG. 13 schematically illustrates a process in response to a received initialization command in accordance with another embodiment.

The copy source volume can be copied to the copy destination volume through reallocation where the copying process is not a multi-copying process and where the copy source volume and the copy destination volume have the same offset amount in the range to be copied (represented by arrows in FIG. 13) with respect to a boundary of the allocation units as illustrated in FIG. 13.

Figure 14:
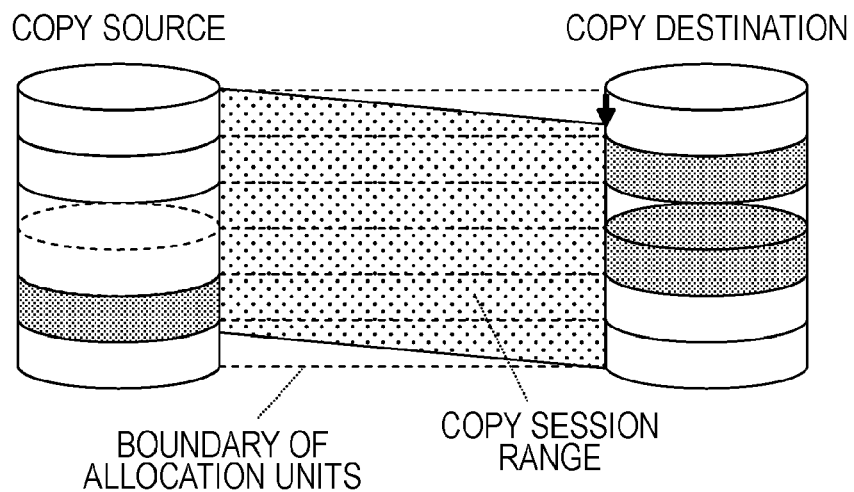
FIG. 14 schematically illustrates a process in response to a received initialization command in accordance with another embodiment.
Figure 15:
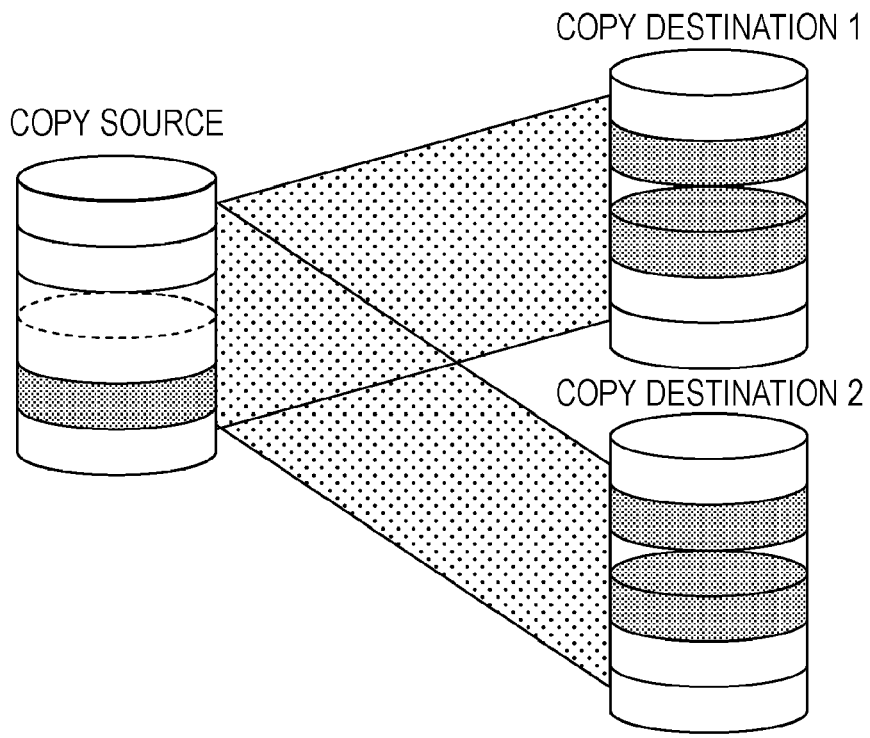
FIG. 15 schematically illustrates a process in response to a received initialization command in accordance with another embodiment.

It is impossible, on the other hand, to copy the copy source volume to the copy destination volume through reallocation where the copying process is not a multi-copying process, where the copy source volume and the copy destination volume have different offset amounts in the range to be copied with respect to the boundary of the allocation units as illustrated in FIG. 14 and where a plurality of copy destination volumes exist as illustrated in FIG. 15.

Figure 16:
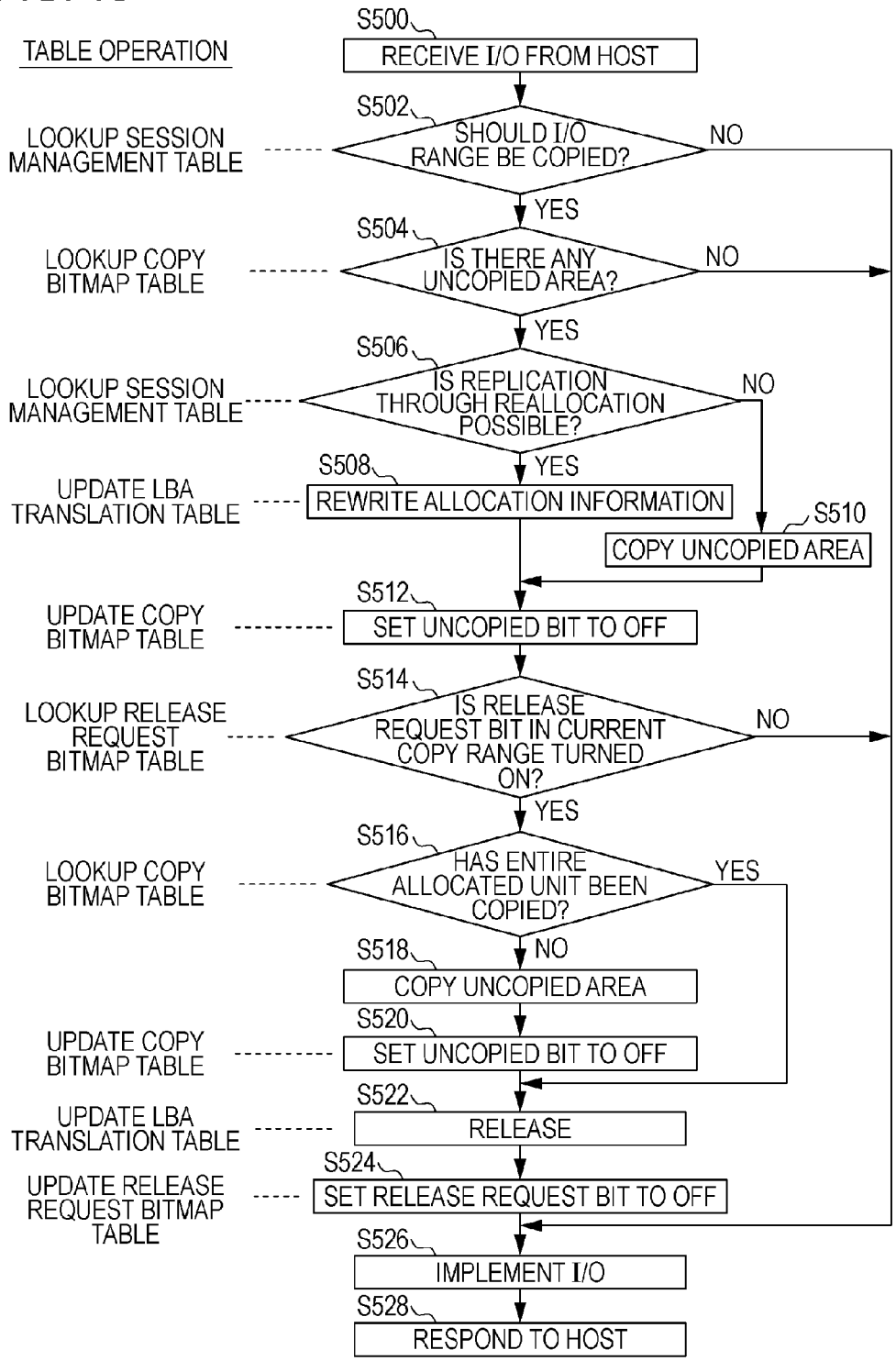
FIG. 16 is a flowchart illustrating a process in response to a received initialization command in accordance with another embodiment.

FIG. 16 is a flowchart illustrating a process upon reception of an I/O in an example in which a copy source volume can be copied to a copy destination volume through reallocation.

When the storage system 100 receives an I/O instruction, such as a Write instruction, from, for example, the host computer 110 (S500), the controller module 130 looks up the session management table loaded in the cache 134 and determines whether or not a range to be I/O specified by the I/O instruction is an area to be copied, i.e., whether or not there is a copy session in the range to be I/O (S502). If there is no copy session (S502: NO), the controller module 130 executes the I/O instruction (S526).

If, on the other hand, there is a copy session (S502: YES), the controller module 130 looks up the copy bit map table loaded in the cache 134 to determine whether or not there is a uncopied area in the area to be copied (S504). If there is no uncopied area (S504: NO), the controller module 130 executes the I/O instruction (S526). If, on the other hand, there is an uncopied area (S504: YES), the controller module 130 looks up the session management table to determine whether or not copying through reallocation is possible (S506). In particular, as described above, the controller module 130 determines whether the copy session with respect to the range to be copied of the copy source volume is not a multi-copy session and whether or not the copy source volume and the copy destination volume have the same offset amount with respect to a boundary of the allocation units.

If copying through reallocation is not possible (S506: NO), the controller module 130 copies the uncopied area to the copy destination volume (S510) and sets the copy bit related to that area in the copy bit map table loaded in the cache 134 to OFF (i.e., "0") (S512). If, on the other hand, copying through reallocation is possible (S506: YES), the controller module 130 specifies the physical area of the physical volume information allocated to that area in the LBA translation table loaded in the cache 134 and reallocates the physical area to the virtual region of the copy destination volume (S508). The controller module 130 then sets the copy bit related to that area of the copy bit map table loaded in the cache 134 to OFF (i.e., "0") (S512).

Next, the controller module 130 looks up the release request bit map table loaded in the cache 134 and determines whether or not there is any area to be copied with the release request bit being set to ON (S514). If there is no area to be copied with the release request bit being set to ON, the controller module 130 executes the I/O instruction (S526). If, on the other hand, there is an area to be copied with the release request bit being set to ON, the controller module 130 copies the area to be copied to the copy destination volume. Then, the controller module 130 looks up the copy bit map table loaded in the cache 134 and determines whether or not the entire area to be copied has already been copied (S516). If the entire area to be copied has been copied (S516: YES), the controller module 130 releases the area (S522). If, on the other hand, the entire area to be copied has not been copied (S516: NO), the controller module 130 copies the uncopied area to the copy destination module (S518) and sets the copy bit related to that area in the copy bit map table loaded in the cache 134 to OFF (S520).

The controller module 130 then executes the releasing process (S522) and sets the release request bit related to that area in the release request bit map table to OFF (S524). The controller module 130 then executes the I/O instruction (S526) and returns a response to the host computer 110 (S528).

Next, a process related to the initialization command upon reception of a normal Write instruction in a uncopied area with the release request bit being set to ON according to another embodiment will be described with reference to FIGS. 17 and 18.

Figure 17:
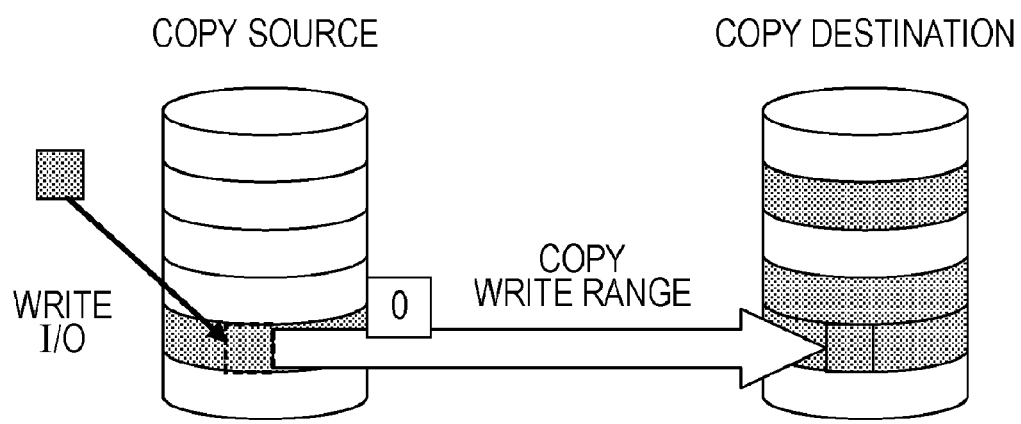
FIG. 17 schematically illustrates a process in response to a received initialization command in accordance with another embodiment.

According to the present embodiment, when arbitrary data may be stored in a range to be initialized after initialization, i.e. when zero guarantee is not expected, only the area to be written may be copied to the copy destination volume without execution of the releasing process and the release request bit may be set to OFF as illustrated in FIG. 17. The Write instruction may thus be executed.

FIG. 18 is a flowchart illustrating a process related to the initialization command according to the present embodiment.

When the storage system 100 receives an I/O instruction from, for example, the host computer 110 (S600), the controller module 130 looks up the session management table loaded in the cache 134 and determines whether or not the I/O range specified by the I/O instruction is an area to be copied, or whether or not the I/O range has a copy session (S602). If there is no copy session (S602: NO), the controller module 130 executes the I/O instruction (S614).

If, on the other hand, there is a copy session (S602: YES), the controller module 130 looks up the copy bit map table loaded in the cache 134 and determines whether or not there is a uncopied area in the area to be copied (S604). If there is no uncopied area (S604: NO), the controller module 130 executes the I/O instruction (S614). If, on the other hand, there is a uncopied area (S604: YES), the controller module 130 copies the uncopied area to the copy destination volume (S606) and sets the copy bit related to that area in the copy bit map table to OFF (i.e., "0") (S608).

Next, the controller module 130 looks up the release request bit map table loaded in the cache 134 and determines whether there is any area to be copied with the release request bit being set to ON (S610). If there is no area to be copied with the release request bit being set to ON, the controller module 130 executes the I/O instruction (S614). If, on the other hand, there is an area to be copied with the release request bit being set to ON, the controller module 130 sets the release request bit related to that area in the release request bit map table loaded in the cache 134 to OFF (S612). Then, the controller module 130 executes the I/O instruction (S614) and returns a response to the host computer 110 (S616).

Although an embodiment of the invention has been described in detail, the invention is not limited to the same. Various modifications and changes may be made without departing from the spirit and scope of the invention as described in the claims.

According to the present disclosure, a copy source volume can be initialized efficiently.

As mentioned above, the present art has been specifically described for better understanding of the embodiments thereof and the above description does not limit other aspects of the art. Therefore, the present art can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage system comprising:
a storage pool for at least a logical volume having a plurality of slices to store data;
a memory to store a slice table indicating whether each slices of the logical volume is assigned from the storage pool or not; and
a controller to execute a procedure, the procedure including:
receiving a write request from a host,
generating a slice in the logical volume by assigning a part of the storage pool according to the received write request,
updating the slice table in the memory when the slice corresponding to the received write request is not assigned from the storage pool in reference to the slice table,
writing data into at least one of the slices according to the received write request,
receiving a release command for releasing one of the slices,
sending out a response indicating releasing of one of the slices corresponding to the release command has completed regardless of an execution of processing corresponding to the release command,
duplicating a part of the slice corresponding to the release command into a copy target volume, and
releasing the one of the slices corresponding to the release command upon completely duplicating the part of the slice corresponding to the release command into the copy target volume.

2. The storage system of claim 1, wherein the duplicating duplicates a copy target area and the releasing releases the one of the slices corresponding to the release command when receiving a write command indicating writing data into the one of the slices corresponding to the release command from the host.

3. The storage system of claim 2, wherein the procedure includes:
executing the write command to the one of the slices which is released.

4. The storage system of claim 1, wherein the procedure includes:
setting a release request bit of the copy target area to on when the copy target area has not been duplicated.

5. The storage system of claim 4, wherein the procedure includes:
setting the release request bit of the copy target area to off when the copy target area has been duplicated.

6. An control apparatus being connectable to a storage pool for at least one of a logical volume having a plurality of slices, comprising:
a memory to store a slice table indicating whether each slices of the logical volume is assigned from the storage pool or not; and a controller to execute a procedure, the procedure including:

receiving a write request from a host, generating a slice in the logical volume by assigning a part of the storage pool according to the received write request updating the slice table in the memory when the slice corresponding to the received write request is not assigned from the storage pool in reference to the slice table, writing data into at least one of the slices according to the received write request, receiving a release command for releasing one of the slices, sending out a response indicating releasing of one of the slices corresponding to the release command has completed regardless of an execution of processing corresponding to the release command, duplicating a copy target area included in the one of the slices corresponding to the release command into a copy target volume included in the storage pool, and releasing the one of the slices corresponding to the release command upon completely duplicating the copy target area into the copy target volume.

7. The control apparatus of claim 6, wherein the duplicating duplicates the copy target area and the releasing releases the one of the slices corresponding to the release command when receiving a write command indicating writing data into the one of the slices corresponding to the release command from the host.

8. The control apparatus of claim 7, wherein the procedure includes:

executing the write command to the one of the slices which is released.

9. The control apparatus of claim 6, wherein the procedure includes:

setting a release request bit of the copy target area to on when the copy target area has not been duplicated.

10. The control apparatus of claim 9, wherein the procedure includes:

setting the release request bit of the copy target area to off when the copy target area has been duplicated.

11. A method of controlling a control apparatus being connectable to a storage pool for at least one of a logical volume having a plurality of slices, having a memory for storing a slice table indicating whether each slices of the logical volume is assigned from the storage pool or not, the method comprising:

receiving a write request from a host;

generating a slice in the logical volume by assigning a part of the storage pool according to the received write request and updating the slice table in the memory when the slice corresponding to the received write request is not assigned from the storage pool in reference to the slice table;

writing data into at least one of the slices according to the received write request in reference to the slice table;

receiving a release command for releasing one of the slices;

sending out a response indicating the releasing of one of the slices corresponding to the release command has completed regardless of an execution of processing corresponding to the release command;

duplicating a copy target area included in the one of the slices corresponding to the release command into a copy target volume included in the storage pool; and releasing the one of the slices corresponding to the release command upon completely duplicating the copy target area into the copy target volume.

12. The method of claim 11, wherein the duplicating duplicates the copy target area and the releasing releases the one of the slices corresponding to the release command when receiving a write command indicating writing data into the one of the slices corresponding to the release command.

13. The method of claim 12, further comprising executing the write command to the one of the slices which is released.

14. The method of claim 11, further comprising setting a release request bit of the copy target area to on when the copy target area has not been duplicated.

15. The method of claim 14, further comprising setting the release request bit of the copy target area to off when the copy target area has been duplicated.

* * * * *

UNITED STATES PATENT AND TRADEMARK OFFICE
CERTIFICATE OF CORRECTION

PATENT NO.         : 8,375,167 B2
APPLICATION NO.    : 12/824334
DATED              : February 12, 2013
INVENTOR(S)        : Masanori Furuya Page 1 of 1

It is certified that error appears in the above-identified patent and that said Letters Patent is hereby corrected as shown below:

In the Claims

Column 14, Line 17, In Claim 11, after "indicating" delete "the".

Signed and Sealed this
Fourteenth Day of May, 2013

Teresa Stanek Rea
*Acting Director of the United States Patent and Trademark Office*